United States Patent [19]

Prassas

[11] Patent Number: 4,891,336

[45] Date of Patent: Jan. 2, 1990

[54] HIGH INDEX PHOTOCHROMIC GLASSES

[75] Inventor: Michel Prassas, Avon, France

[73] Assignee: Corning Incorporated, Corning, N.Y.

[21] Appl. No.: 281,637

[22] Filed: Dec. 9, 1988

[30] Foreign Application Priority Data

Jul. 29, 1988 [FR] France ................. 8810269

[51] Int. Cl.$^4$ .............................................. C03C 4/06
[52] U.S. Cl. .............................................. 501/13
[58] Field of Search ...................................... 501/13

[56]  References Cited

U.S. PATENT DOCUMENTS

| | | | |
|---|---|---|---|
| 3,630,765 | 12/1971 | Aranjo .................... | 501/13 |
| 3,703,388 | 11/1972 | Aranjo et al. ............ | 501/13 |
| 3,999,996 | 12/1976 | Faulstich et al. ........ | 501/13 |
| 4,149,896 | 4/1979 | Faulstich et al. ........ | 501/13 |
| 4,486,541 | 12/1984 | Gliemeroth et al. ...... | 501/13 |
| 4,686,196 | 8/1987 | Gliemeroth et al. ...... | 501/13 |

*Primary Examiner*—Mark L. Bell
*Attorney, Agent, or Firm*—Clinton S. Janes, Jr.

[57]  ABSTRACT

The present invention is related to transparent, fast darkening and fading photochromic glasses.

The glasses contain $SiO_2$, $B_2O_3$, $Al_2O_3$, $ZrO_2$, $Li_2O$, $Na_2O$, $K_2O$, MgO, CaO, SrO, BaO, ZnO, $La_2O_3$, $Nb_2O_5$, $TiO_2$ as base glass components, Ag, Br, Cl, CuO as photochromic elements, with, optionally, $Sb_2O_3$, $As_2O_3$, and $SnO_2$ as colorants to impart a brown color at darkening.

The glasses have a refractive index greater than 1.585, an Abbe number greater than 42, and a density lower than about 2.80 g/cm$^3$.

6 Claims, No Drawings

HIGH INDEX PHOTOCHROMIC GLASSES

BACKGROUND OF THE INVENTION

The present invention is related to high index, low dispersion, low density and fast darkening and fading photochromic glasses for ophthalmic lenses.

In the present context, fast darkening and fading glasses means glasses which show at room temperatures after 15 minutes' exposure to an actinic illumination, a luminous transmission lower or equal to 40% and a luminous transmission greater than about 55% five minutes after they have been removed from the actinic source.

Most of prior art patents dealing with photochromic glasses describe compositions to obtain products, for ophthalmic applications or not, having a refractive index equal to about 1.523.

Ophthalmic lenses of high refractive index present numerous advantages. In fact, using a high index glass instead of a standard glass ($n_D = 1.523$) allows, for a given power, a thickness reduction of the edge (negative power) or of the center (positive power).

Increasing the index of refraction leads generally to a decrease of the Abbe number (or an increase of glass dispersion). In order to minimize the defects induced by the increase of the glass dispersion, mainly colored fringes at the edge of the lens, the glass must have a high Abbe number.

Associated with thickness reduction, another significant advantage can be a lower weight. For that the glass must display a low density; a density less than or equal to 2.80 g/cm$^3$ is necessary.

The objective of this invention is to combine these advantages of a high refractive index glass, including the above-mentioned criteria, with the advantages of a photochromic glass. This has become a necessity because within a few years the use of glasses with a 1.6 index of refraction will tend to replace for ophthalmic applications the current glasses having a refractive index of 1.523. Thus, the wearer of corrective eyeglasses would get simultaneously the comfort given by a high index lens and the functionality of a photochromic glass.

SUMMARY OF THE INVENTION

The object of the present invention is to provide a photochromic lens of high index of refraction with rapid darkening and fading, a lens comprising a glass having:

(a) a refractive index between 1.585 and 1.610;
(b) an Abbe number greater than 42;
(c) a density lower than about 2.80 g/cm$^3$, and, for a 2 mm thickness, exhibits the following optical properties:

(1) a luminous transmission in the unexposed state ($T_o$) greater or equal to about 84%;

(2) a luminous transmission, in the darkened state after 15 minutes' exposure to an actinic radiation ($T_{D15}$) at a temperature in the 0° to 25° C. range, less than about 40% and preferably less than 35%;

(3) a fading rate at ambient temperature (20° to 25° C.) such that, five minutes after it has been removed from the actinic light, the glass has a luminous transmission ($T_{F5}$) of at least 55% and preferably, in excess of 60%;

(4) a difference between the luminous transmissions of the darkened state over the temperature range of 25° C. to 40° C. less than 23 points of transmission and preferably less than or equal to 20 points.

This last parameter reflects the temperature dependence of the glasses according to the invention and in relation with parameters (1), (2), and (3), describes the optical characteristics of the lens over the extent of the 20° to 40° C. temperature range. Furthermore, the color characteristics of the lens in the clear state as well as in the darkened state are described by the trichromatic coordinates which will be explained hereinafter.

The above optical and photochromic properties of the present glasses are obtained in the alkali, aluminoborosilicate composition family which contain niobium oxide. In contrast to the photochromic glasses with an index of refraction of 1.523, the compositions described in this invention must necessarily contain oxides which contribute strongly to the index of refraction such as $La_2O_3$, $Nb_2O_5$, $TiO_2$, CaO, SrO, and BaO in appreciable quantities when they are present in the composition in order to satisfy the above-mentioned criteria.

The base glass compositions consist essentially, expressed in terms of weight percent on the oxide basis, of:

| | | | |
|---|---|---|---|
| $SiO_2$ | 33–50 | MgO | 0–5 |
| $B_2O_3$ | 15–25 | CaO | 0–5 |
| $SiO_2 + B_2O_3$ | 58–66 | SrO | 0–10 |
| $Al_2O_3$ | 2–9 | BaO | 0–10 |
| $ZrO_2$ | 1–5 | ZnO | 0–5 |
| $Al_2O_3 + ZrO_2$ | 4–10 | MgO + CaO + SrO + BaO + ZnO | 1–15 (XO) |
| $Li_2O$ | 1.5–6 | $X_2O + XO$ | 10–24 |
| $Na_2O$ | 0–4 | $La_2O_3$ | 0–5 |
| $K_2O$ | 2–9 | $Nb_2O_5$ | 8–16 |
| $Li_2O + Na_2O + K_2O$ | 7–16 ($X_2O$) | $TiO_2$ | 2–8 |
| $Li_2O/X_2O$ | 0.20–0.50 | $ZrO_2 + TiO_2 + Nb_2O_5 + La_2O_3$ | 14–23 |

The preferred base glasses consist essentially of:

| | | | |
|---|---|---|---|
| $SiO_2$ | 36–48 | MgO | 0 |
| $B_2O_3$ | 15–20 | CaO | 0 |
| $SiO_2 + B_2O_3$ | 57–63 | SrO | 2–8 |
| $Al_2O_3$ | 5–8 | BaO | 0 |
| $ZrO_2$ | 1–4 | ZnO | 0 |
| $Al_2O_3 + ZrO_2$ | 6–10 | MgO + CaO + SrO + BaO + ZnO | 2–9 (XO) |
| $Li_2O$ | 2–2.5 | $X_2O + XO$ | 10–20 |
| $Na_2O$ | 0.3–2.5 | $La_2O_3$ | 0 |
| $K_2O$ | 3–8 | $Nb_2O_5$ | 8–14 |
| $Li_2O + Na_2O + K_2O$ | 8–12 ($X_2O$) | $TiO_2$ | 2–7 |
| $Li_2O/X_2O$ | 0.35–0.50 | $ZrO_2 + TiO_2 + Nb_2O_5 + La_2O_3$ | 15–23 |

In addition to the composition of the base glass, the obtaining of photochromic properties such as are defined above requires the introduction of photochromic elements in the following proportions, expressed in terms of weight percent as analyzed in the glass:

| | |
|---|---|
| Ag | 0.130–0.280 |
| Br | 0.130–0.220 |
| Ag + Br | >0.270 |
| Cl | 0.170–0.360 |
| CuO | 0.0070–0.0350 |

The preferred proportions consisting essentially of:

| | |
|---|---|
| Ag | 0.135–0.180 |
| Br | 0.140–0.170 |
| Ag + Br | >0.280 |
| Cl | 0.200–0.300 |
| CuO | 0.0120–0.0300 |

Chlorine is used in quantities of 0.17–0.36%, preferably 0.2–0.3%, as analyzed in weight percent in the glass. It is an indispensable element which, when present in the correct proportions, permits the desired photochromic performance to be obtained. Its inclusion at too low a level leads to glasses exhibiting insufficient darkening, whereas too high a content decreases the fading rate and the sensitivity of the glass to visible light.

The CuO content is 0.0070–0.0350, preferably 0.0120–0.0300, as analyzed in weight percent in the glass. CuO acts as a "sensitizer" of silver halides and, therefore, its level in the glass must be carefully controlled. Below 0.0070%, the darkening of the glass is insufficient. On the other hand, above 0.030%, the temperature dependence of the glass becomes unacceptable.

The limits of the above-specified ranges for the constituents of the base glass are equally crucial in order to obtain glasses exhibiting good melting and forming capability, and possessing the chemical and physical properties, e.g., strengthening by chemical and/or physical tempering and good durability, demanded of glasses to be utilized in optical and ophthalmic applications, as well as the required photochromic behavior. More specifically, the viscosity at the liquidus temperature must be sufficient to permit pressing employing conventional forming techniques, i.e., a liquidus viscosity equal to or greater than about 200 poises.

$SiO_2$ and $B_2O_3$ constitute the basic components of this type of glass. Their sum determines the quantity of other oxides and influences the devitrification characteristics. It will be greater than 58% and lower than 66%. This condition is not sufficient to get the requested photochromic performances. The aptitude to precipitate silver halides, in an appropriate temperature range, depends on the amount of $B_2O_3$. It must not be lower than 15%. It is also known that $B_2O_3$ imparts a negative effect on the glass chemical durability and therefore the maximal content is fixed at 25% and preferably 20%.

$Al_2O_3$ is important because it affects the ability to retain in the glass Ag, Br, and Cl. For that reason, 2% at least, will be present and preferably at least 5%. In addition, $Al_2O_3$ stabilizes the glass against the natural tendency of these glasses to phase separation and as $ZrO_2$, $Al_2O_3$ improves the chemical durability of the glass.

Furthermore, $Al_2O_3$ increases considerably the glass viscosity which is favorable for the viscosity at the liquidus.

$ZrO_2$ improves the durability against alkaline attack and 1% at least must be present. It contributes significantly to the refractive index but also, increases quickly the crystallization characteristics of the glass. Therefore, a maximum of 5% will be present in the glass. It has been observed that in high alumina glasses, the $ZrO_2$ amount must be limited to avoid devitrification. Thus, the sum ($Al_2O_3 + ZrO_2$) should be between 4 and 10%, and preferably between 6 and 10%.

Along with their small contribution to the density of the glass, the alkalies ($Li_2O$, $Na_2O$, $K_2O$) are necessary to obtain the desired photochromism.

Among the alkalies, $Li_2O$ makes it possible to obtain the desired fading rate. The glass will contain at least 1.5% $Li_2O$ and preferably at least 2%. However, it decreases considerably the viscosity and increases the tendency to devitrification and phase separation. The maximum content is 6%, and preferably 5.5%.

$Na_2O$ is favorable to increase the mechanical strength which can be obtained by chemical strengthening. Consequently, the glasses will contain preferably at least 0.3% $Na_2O$. Due to its negative effect on the fading rate, a maximum of 4% will be used.

$K_2O$ is used in conjunction with $Li_2O$ at 2 to 9 wt. % and preferably at 3 to 8 wt. %. In fact, as already mentioned, $Li_2O$ makes it possible to obtain fast fading glasses. However, inasmuch as the photochromic behavior is the result of two opposite mechanisms occurring simultaneously (darkening and thermal fading), a too high fading rate will lead generally to a low darkening glass. $K_2O$ enables one to get dark glasses without affecting too much the fading rate when present at 2 to 9%.

In a general way, the combination of the three alkali oxides is preferred. In this case, as mentioned previously, the following conditions should be satisfied:

| | | |
|---|---|---|
| 7 | $<X_2O$ | $<16$ |
| 0.20 | $<Li_2O/X_2O$ | $<0.6$ | with $X_2O = Li_2O + Na_2O + K_2O$.

The main contributor to the refractive index is $Nb_2O_5$. Its effect on index is close to $TiO_2$ but it is not as powerful as $TiO_2$ to increase the glass dispersion. Furthermore, it is equivalent to $Al_2O_3$ for the photochromic performances.

$Nb_2O_5$ must be present at a level of at least 8%. However, being very expensive, a maximum of 16% and preferably of 14% will be used.

$TiO_2$ has no specific effect on the photochromic properties. At least 2% will be introduced in the glass. High $TiO_2$ content would impart to the glass an undesirable yellow coloration and would enhance the tendency to phase separation. For those reasons, the $TiO_2$ content will not exceed 8% and preferably will be lower or equal to 7%.

In order to increase the refractive index, oxides such as: MgO, CaO, SrO, BaO, ZnO, and $Li_2O_3$ can also be added to the base glass. Among the divalent oxides, MgO and CaO have a small contribution to the density but also to the refractive index. However, although the desired photochromic performances can be obtained with those oxides, SrO will be preferred according to the invention. SrO stabilizes the glass toward devitrification and phase separation. Consequently, SrO will be present in the glass at a level equal to or greater than 2% and lower than 8%.

To satisfy the constraints on refractive index and on density, the sum of divalent oxides (MgO+CaO+SrO+BaO+ZnO=XO) must meet the following condition:

| | |
|---|---|
| | $1 < XO < 15$ |
| preferably | $2 < XO < 12$ |

-continued

| | |
|---|---|
| and most particularly | $2 < XO < 9.$ |

Furthermore, in presence of alkalies ($Li_2O$, $Na_2O$, $K_2O$) and to have a glass stable against devitrification, the sum ($X_2O+XO$) must fulfill the condition: $10 < X_2O+XO < 24$.

Finally, $La_2O_3$ not only strongly increases the refractive index but also the density. The glass will not contain more than 5% and preferably it will be absent from its composition.

With the limitations above mentioned and taking into account the required characteristics, the oxides having a large contribution to the refractive index such as $ZrO_2$, $TiO_2$, $Nb_2O_5$, and $La_2O_3$ must satisfy in a general way the condition:

$$14 < ZrO_2 + TiO_2 + Nb_2O_5 + La_2O_3 < 23$$

The compositions which meet the conditions above mentioned, lead to glasses displaying all the optical and photochromic characteristics described in this invention. The natural color of the glasses is, in the clear or unexposed state, slightly yellow or green and, in the darkened state, gray or brown-gray.

The glasses according to the invention can also be brown in the darkened state. Generally, and as described in prior art patents, to obtain a brown tint at darkening, noble metals such as Pd and Au, are added.

The brown photochromic glasses according to the invention, contain elements such as $Sb_2O_3$, $As_2O_3$, and/or $SnO_2$.

For a given composition and to get a significant coloration, the sum of these oxides must be equal, at least, to 0.10%. However, it will be lower than 1% because they are also powerful redox agents. The values given are in weight percentage as analyzed in the glass.

According to a preferred embodiment of the invention, antimony oxide will be used to get a brown glass at darkening. The maximal $Sb_2O_3$ content is 0.65%. Above that value, $Sb_2O_3$ imparts to the glass a too strong yellow coloration in the clear state, i.e., the transmission $T_0$ would be too low. In order to avoid undesirable effects (too reduced glass, Ag metallic precipitation), $Sb_2O_3$ will be used with preferred compositions for Ag, Cl, Br, CuO as defined previously.

Those "colorants" give to the glass in the clear state, a slightly yellow tint. If necessary, it can be attenuated by addition of colorant oxides such as $Er_2O_3$, CoO, or $Nd_2O_3$.

Prior Art

U.S. Pat. No. 3,630,765 discloses photochromic glasses exhibiting refractive indices higher than 1.54. The essence of the inventive glasses comprised adding 10-50% by weight $Ta_2O_5$ to silver halide-containing, alkali metal aluminoborosilicate base glass compositions to raise the refractive index thereof. No mention is made of $Nb_2O_5$, $TiO_2$, and/or $ZrO_2$.

U.S. Pat. No. 3,703,388 is expressly directed to high refractive index photochromic glasses. The glasses consisted essentially, in weight percent, of 15-75% $La_2O_3$, 13-65% $B_2O_3$, the sum $La_2O_3+B_2O_3$ being at least 30%, with silver halides being present there. Various proportions of $Nb_2O_5$, $TiO_2$, and $ZrO_2$ are mentioned as optional components. Nevertheless, the base glass compositions are far afield from those of the present invention.

U.S. Pat. No. 3,999,996 is drawn to silver halide-containing photochromic glasses demonstrating refractive indices $\geq 1.60$ having base glass compositions consisting essentially, in weight percent, of:

| | | | |
|---|---|---|---|
| $SiO_2$ | 10-20 | $ZrO_2$ | 0.5-3 |
| $B_2O_3$ | 15-23 | $TiO_2$ | 0.2-3 |
| PbO | 26-30 | $K_2O$ | 0.1-2 |
| ZnO | 3-5 | $Na_2O$ | 0.1-2 |
| $La_2O_3$ | 6-10 | $Li_2O$ | 0.1-4 |
| $Al_2O_3$ | 12-17 | | |

Such compositions are very remote from those of the present invention.

U.S. Pat. No. 4,149,896 is concerned with silver halide-containing photochromic glasses exhibiting refractive indices in excess of 1.60 having base compositions consisting essentially, in weight percent, of:

| | | | |
|---|---|---|---|
| $SiO_2$ | 5-30 | $ZrO_2$ | 0-6 |
| $B_2O_3$ | 7-35 | $TiO_2$ | 0-3 |
| PbO | 6-26 | $K_2O$ | 0-2 |
| ZnO | 0-15 | $Na_2O$ | 0-2 |
| $La_2O_3$ | 12-30 | $Li_2O$ | 0-4 |
| $Al_2O_3$ | 12-25 | $Bi_2O_3$ and/or $Ta_2O_5$ and/or $Nb_2O_3$ and/or $WO_3$ | 0-5 |

Such compositions are quite removed from the ranges of the present invention.

U.S. Pat. No. 4,486,541 describes silver halide-containing photochromic glasses exhibiting refractive indices $\geq 1.59$ claiming base compositions consisting essentially, in weight percent, of:

| | | | |
|---|---|---|---|
| $SiO_2$ | 32-47 | $WO_3$ | 0-1 |
| $B_2O_3$ | 14.5-27 | MgO | 0-1 |
| $P_2O_5$ | 0-11 | CaO | 0-6 |
| $SiO_2 + B_2O_3 + P_2O_5$ | 58-71 | SrO | 0-24 |
| $Al_2O_3$ | 0-0.4 | PbO | 0.5-12 |
| $ZrO_2$ | 1.5-10 | $TiO_2$ | 0.5-8 |
| $La_2O_3$ | 0-23 | $Li_2O$ | 0.5-6 |
| $Nb_2O_5$ | 0-2 | $Na_2O$ | 0-4 |
| $Ta_2O_5$ | 0-18 | $K_2O$ | 6-12 | wherein $Li_2O+Na_2O+K_2O$ 6.5-15 and
wherein $Al_2O_3+ZrO_2+La_2O_3+Nb_2O_5+Ta_2O_5+WO_3$ 2-25 and
wherein $MgO+CaO+SrO$ 2-24 and
wherein $La_2O_3+SrO+PbO+TiO_2+Nb_2O_5+ZrO_2+WO_3+Ta_2O_5$ 12-34

Such compositions are outside of those of the present invention at least with respect to $Al_2O_3$, $Nb_2O_5$, and PbO.

U.S. Pat. No. 4,686,196 presents silver halide-containing photochromic glasses demonstrating refractive indices $\geq 1.59$ claiming base compositions consisting essentially, in weight percent, of:

| | | | |
|---|---|---|---|
| $SiO_2$ | 42-56 | SrO | 0-3 |
| $B_2O_3$ | 11-18 | BaO | 0-6 |
| $Al_2O_3$ | 0-5 | ZnO | 0-2 |
| $SiO_2 + B_2O_3 + Al_2O_3$ | 55-75 | $MgO + CaO + SrO + BaO + ZnO$ | 3-12 |
| $Li_2O$ | 3-9 | $TiO_2$ | 3.06-6.74 |
| $Na_2O$ | 0-7.98 | $ZrO_2$ | 2-11 |
| $K_2O$ | 0-8.22 | $Nb_2O_5$ | 2.28-8 |
| $Li_2O + Na_2O + K_2O$ | 7-15 | $La_2O_3$ | 0-3 |

| | -continued | | |
|---|---|---|---|
| MgO | 3–12 | PbO | 0–2 |
| CaO | 0–3 | $Er_2O_3$ | 0–1 |

Such compositions are low in $Nb_2O_5$ and SrO and require the presence of MgO.

Description of Preferred Embodiments

The following examples, which must be deemed illustrative only and not limitative, describe the invention. Compositions are given in Table I. The quantities of components are expressed in parts by weight on the oxide basis. Taking into account that the total of components is equal to or close to 100, the given values can be considered as weight percent.

As the cation(s) to which halogens are bound are not known, and because they are present in small amounts, they are reported as chlorine and bromine in agreement with the usual practice. Silver, present also in small amounts, is given as the metal.

The reported values for Ag, Cl, Br, CuO, $Sb_2O_3$, and $SnO_2$ are, in general, as analyzed in the glasses, except if specifically mentioned otherwise.

Batches are prepared from raw materials, oxides, or other compounds which, when they are melted together, are converted into the desired oxides at the required level. Chlorine and bromine are generally incorporated as halides of alkali metals. Components used to tint the glass are generally added as oxides or compounds of the metal.

Ingredients of the raw materials batch are weighed and carefully mixed (ballmilled) to help in achieving homogeneity of the melted glass. Then they are charged into a platinum crucible, that crucible is introduced into a furnace heated by Joule effect, and the batch is melted at 1350° C. for about 3 hours. After casting to form a slab, the glass is annealed at about 450° C.

TABLE I

| | 1 | 2 | 3 | 4 |
|---|---|---|---|---|
| $SiO_2$ | 39.64 | 40.42 | 39.82 | 38.48 |
| $B_2O_3$ | 21.20 | 21.62 | 21.30 | 20.58 |
| $Al_2O_3$ | 6.21 | 6.33 | 6.24 | 6.03 |
| $ZrO_2$ | 2.50 | 2.55 | 2.51 | 2.43 |
| $Li_2O$ | 4.40 | 4.48 | 4.42 | 4.27 |
| $Na_2O$ | 1.26 | 1.28 | 1.26 | 1.22 |
| $K_2O$ | 5.26 | 5.36 | 5.28 | 5.10 |
| CaO | — | 2.32 | — | — |
| $La_2O_3$ | — | — | — | — |
| $Nb_2O_5$ | 10.79 | 11.00 | 10.84 | 10.47 |
| $TiO_2$ | 2.43 | 2.48 | 2.44 | 2.36 |
| SrO | 6.31 | 2.14 | 4.23 | — |
| BaO | — | — | — | 9.06 |
| ZnO | — | — | 1.66 | — |
| $SiO_2 + B_2O_3$ | 60.8 | 62.0 | 61.1 | 59.1 |
| $Li_2O/X_2O$ | 0.40 | 0.40 | 0.40 | 0.40 |
| $Al_2O_3 + ZrO_2$ | 8.7 | 8.9 | 8.8 | 8.5 |
| $Nb_2O_5 + TiO_2 + ZrO_2 + La_2O_3$ | 15.7 | 16.0 | 15.8 | 15.3 |
| XO | 6.3 | 4.5 | 5.9 | 9.1 |
| $XO + X_2O$ | 17.2 | 15.6 | 16.8 | 19.7 |
| Ag | 0.232 | 0.257 | 0.239 | 0.257 |
| Cl | 0.328 | 0.353 | 0.344 | 0.340 |
| Br | 0.211 | 0.203 | 0.199 | 0.137 |
| CuO | 0.0100 | 0.0100 | 0.0100 | 0.0100 |

| | 5 | 6 | 7 | 8 |
|---|---|---|---|---|
| $SiO_2$ | 41.97 | 42.23 | 41.95 | 41.41 |
| $B_2O_3$ | 17.28 | 19.30 | 19.73 | 18.78 |
| $Al_2O_3$ | 5.80 | 3.00 | 6.19 | 6.11 |
| $ZrO_2$ | 2.90 | 4.88 | 2.49 | 2.46 |
| $Li_2O$ | 4.54 | 4.30 | 4.38 | 4.63 |
| $Na_2O$ | 0.61 | 1.23 | 1.25 | 0.62 |
| $K_2O$ | 5.08 | 5.13 | 5.24 | 5.18 |
| CaO | — | 2.22 | 2.27 | — |
| $La_2O_3$ | — | 3.22 | 3.30 | — |
| $Nb_2O_5$ | 10.43 | 10.52 | 10.76 | 10.62 |
| $TiO_2$ | 4.39 | 3.95 | 2.43 | 3.99 |
| SrO | 6.10 | — | — | 6.21 |
| BaO | 0.90 | — | — | — |
| $SiO_2 + B_2O_3$ | 59.2 | 61.5 | 61.7 | 60.2 |
| $Li_2O/X_2O$ | 0.44 | 0.40 | 0.40 | 0.44 |
| $Al_2O_3 + ZrO_2$ | 8.7 | 7.9 | 8.7 | 8.6 |
| $Nb_2O_5 + TiO_2 + ZrO_2 + La_2O_3$ | 17.7 | 22.6 | 19.0 | 17.1 |
| XO | 7.0 | 2.2 | 2.3 | 6.2 |
| $XO + X_2O$ | 17.2 | 12.9 | 13.2 | 16.6 |
| Ag | 0.145 | 0.190 | 0.190 | 0.169 |
| Cl | 0.240 | 0.330 | 0.335 | 0.279 |
| Br | 0.156 | 0.156 | 0.157 | 0.144 |
| CuO | 0.0130 | 0.0110 | 0.0110 | 0.0100 |

| | 9 | 10 | 11 | 12 |
|---|---|---|---|---|
| $SiO_2$ | 41.41 | 41.15 | 41.76 | 42.75 |
| $B_2O_3$ | 18.78 | 18.17 | 19.00 | 18.21 |
| $Al_2O_3$ | 6.11 | 6.07 | 6.16 | 6.13 |
| $ZrO_2$ | 2.46 | 2.45 | 2.48 | 2.47 |
| $Li_2O$ | 4.63 | 4.60 | 4.69 | 4.66 |
| $Na_2O$ | 0.62 | 0.62 | 0.62 | 0.62 |
| $K_2O$ | 5.18 | 5.14 | 4.87 | 4.84 |
| CaO | — | — | — | — |
| $La_2O_3$ | — | — | — | — |
| $Nb_2O_5$ | 10.62 | 10.55 | 8.03 | 8.04 |
| $TiO_2$ | 3.99 | 5.08 | 6.12 | 6.09 |
| SrO | 6.21 | 6.17 | 6.26 | 6.23 |
| $SiO_2 + B_2O_3$ | 60.2 | 59.3 | 60.8 | 61.0 |
| $Li_2O/X_2O$ | 0.44 | 0.44 | 0.46 | 0.46 |
| $Al_2O_3 + ZrO_2$ | 8.6 | 8.5 | 8.6 | 8.6 |
| $Nb_2O_5 + TiO_2 + ZrO_2 + La_2O_3$ | 17.1 | 18.1 | 16.6 | 16.5 |
| XO | 6.2 | 6.2 | 6.3 | 6.2 |
| $XO + X_2O$ | 16.6 | 16.5 | 16.4 | 16.4 |
| Ag | 0.142 | 0.144 | 0.192 | 0.163 |
| Cl | 0.238 | 0.240 | 0.320 | 0.320 |
| Br | 0.186 | 0.178 | 0.180 | 0.180 |
| CuO | 0.0130 | 0.0130 | 0.0100 | 0.0100 |

| | 13 | 14 | 15 | 16 |
|---|---|---|---|---|
| $SiO_2$ | 42.58 | 42.58 | 42.58 | 42.58 |
| $B_2O_3$ | 17.27 | 17.27 | 17.27 | 17.27 |
| $Al_2O_3$ | 5.87 | 5.87 | 5.87 | 5.87 |
| $ZrO_2$ | 2.93 | 2.93 | 2.93 | 2.93 |
| $Li_2O$ | 4.89 | 4.89 | 4.89 | 4.89 |
| $Na_2O$ | 0.62 | 0.62 | 0.62 | 0.62 |
| $K_2O$ | 4.67 | 4.67 | 4.67 | 4.67 |
| CaO | — | — | — | — |
| $La_2O_3$ | — | — | — | — |
| $Nb_2O_5$ | 10.55 | 10.55 | 10.55 | 10.55 |
| $TiO_2$ | 4.44 | 4.44 | 4.44 | 4.44 |
| SrO | 6.17 | 6.17 | 6.17 | 6.17 |
| $SiO_2 + B_2O_3$ | 59.9 | 59.9 | 59.9 | 59.9 |
| $Li_2O/X_2O$ | 0.48 | 0.48 | 0.48 | 0.48 |
| $Al_2O_3 + ZrO_2$ | 8.8 | 8.8 | 8.8 | 8.8 |
| $Nb_2O_5 + TiO_2 + ZrO_2 + La_2O_3$ | 17.9 | 17.9 | 17.9 | 17.9 |
| XO | 6.2 | 6.2 | 6.2 | 6.2 |
| $XO + X_2O$ | 16.4 | 16.4 | 16.4 | 16.4 |
| Ag | 0.204 | 0.150 | 0.151 | 0.151 |
| Cl | 0.330 | 0.267 | 0.284 | 0.286 |
| Br | 0.167 | 0.167 | 0.149 | 0.153 |
| CuO | 0.0130 | 0.0140 | 0.140 | 0.0140 |
| $Sb_2O_3$ | — | — | — | — |
| $As_2O_3$ | — | — | 0.15 | — |
| $SnO_2$ | — | — | — | 0.20 |

| | 17 | 18 | 19 | 20 |
|---|---|---|---|---|
| $SiO_2$ | 42.58 | 42.58 | 42.58 | 42.15 |
| $B_2O_3$ | 17.27 | 17.27 | 17.27 | 17.08 |
| $Al_2O_3$ | 5.87 | 5.87 | 5.87 | 5.70 |
| $ZrO_2$ | 2.93 | 2.93 | 2.93 | 2.91 |
| $Li_2O$ | 4.89 | 4.89 | 4.89 | 4.87 |
| $Na_2O$ | 0.62 | 0.62 | 0.62 | 0.61 |
| $K_2O$ | 4.67 | 4.67 | 4.67 | 4.63 |
| CaO | — | — | — | — |
| $La_2O_3$ | — | — | — | — |

TABLE I-continued

|  | | | | |
|---|---|---|---|---|
| Nb$_2$O$_5$ | 10.55 | 10.55 | 10.55 | 10.40 |
| TiO$_2$ | 4.44 | 4.44 | 4.44 | 4.39 |
| SrO | 6.17 | 6.17 | 6.17 | 6.25 |
| SiO$_2$ + B$_2$O$_3$ | 59.9 | 59.9 | 59.9 | 59.2 |
| Li$_2$O/X$_2$O | 0.48 | 0.48 | 0.48 | 0.48 |
| Al$_2$O$_3$ + ZrO$_2$ | 8.8 | 8.8 | 8.8 | 8.6 |
| Nb$_2$O$_5$ + TiO$_2$ + ZrO$_2$ + La$_2$O$_3$ | 17.9 | 17.9 | 17.9 | 17.7 |
| XO | 6.2 | 6.2 | 6.2 | 6.3 |
| XO + X$_2$O | 16.4 | 16.4 | 16.4 | 16.4 |
| Ag | 0.149 | 0.137 | 0.149 | 0.144 |
| Cl | 0.227 | 0.278 | 0.271 | 0.232 |
| Br | 0.168 | 0.168 | 0.163 | 0.155 |
| CuO | 0.0140 | 0.0100 | 0.0140 | 0.0170 |
| Sb$_2$O$_3$ | 0.12 | 0.17 | 0.17 | 0.40 |

|  | 21 | 22 | 23 | 24 |
|---|---|---|---|---|
| SiO$_2$ | 42.15 | 42.15 | 42.15 | 42.15 |
| B$_2$O$_3$ | 17.08 | 17.08 | 17.08 | 17.08 |
| Al$_2$O$_3$ | 5.70 | 5.70 | 5.70 | 5.70 |
| ZrO$_2$ | 2.91 | 2.91 | 2.91 | 2.91 |
| Li$_2$O | 4.87 | 4.87 | 4.87 | 4.87 |
| Na$_2$O | 0.61 | 0.61 | 0.61 | 0.61 |
| K$_2$O | 4.63 | 4.63 | 4.63 | 4.63 |
| CaO | — | — | — | — |
| La$_2$O$_3$ | — | — | — | — |
| Nb$_2$O$_5$ | 10.40 | 10.40 | 10.40 | 10.40 |
| TiO$_2$ | 4.39 | 4.39 | 4.39 | 4.39 |
| SrO | 6.25 | 6.25 | 6.25 | 6.25 |
| SiO$_2$ + B$_2$O$_3$ | 59.2 | 59.2 | 59.2 | 59.2 |
| Li$_2$O/X$_2$O | 0.48 | 0.48 | 0.48 | 0.48 |
| Al$_2$O$_3$ + ZrO$_2$ | 8.6 | 8.6 | 8.6 | 8.6 |
| Nb$_2$O$_5$ + TiO$_2$ + ZrO$_2$ + La$_2$O$_3$ | 17.7 | 17.7 | 17.7 | 17.7 |
| XO | 6.3 | 6.3 | 6.3 | 6.3 |
| XO + X$_2$O | 16.4 | 16.4 | 16.4 | 16.4 |
| Ag | 0.147 | 0.147 | 0.146 | 0.146 |
| Cl | 0.232 | 0.203 | 0.258 | 0.230 |
| Br | 0.159 | 0.158 | 0.159 | 0.154 |
| CuO | 0.0200 | 0.0200 | 0.0200 | 0.0230 |
| Sb$_2$O$_3$ | 0.40 | 0.52 | 0.50 | 0.54 |

|  | 25 | 26 | 27 | 28 |
|---|---|---|---|---|
| SiO$_2$ | 42.15 | 42.15 | 41.57 | 40.76 |
| B$_2$O$_3$ | 17.08 | 17.08 | 21.12 | 19.17 |
| Al$_2$O$_3$ | 5.70 | 5.70 | 5.80 | 4.01 |
| ZrO$_2$ | 2.91 | 2.91 | 2.34 | 7.27 |
| Li$_2$O | 4.87 | 4.87 | 2.27 | 4.26 |
| Na$_2$O | 0.61 | 0.61 | 1.17 | 1.22 |
| K$_2$O | 4.63 | 4.63 | 3.57 | 5.09 |
| CaO | — | — | 2.13 | 2.21 |
| La$_2$O$_3$ | — | — | 6.18 | 3.20 |
| Nb$_2$O$_5$ | 10.40 | 10.40 | 10.08 | 10.45 |
| TiO$_2$ | 4.39 | 4.39 | 3.79 | 2.36 |
| SrO | 6.25 | 6.25 | — | — |
| SiO$_2$ + B$_2$O$_3$ | 59.2 | 59.2 | 62.7 | 59.9 |
| Li$_2$O/X$_2$O | 0.48 | 0.48 | 0.32 | 0.40 |
| Al$_2$O$_3$ + ZrO$_2$ | 8.6 | 8.6 | 8.1 | 11.3 |
| Nb$_2$O$_5$ + TiO$_2$ + ZrO$_2$ + La$_2$O$_3$ | 17.7 | 17.7 | 22.4 | 23.3 |
| XO | 6.3 | 6.3 | 2.1 | 2.2 |
| XO + X$_2$O | 16.4 | 16.4 | 9.1 | 12.8 |
| Ag | 0.145 | 0.142 | 0.166 | 0.190 |
| Cl | 0.235 | 0.249 | 0.320 | 0.320 |
| Br | 0.160 | 0.159 | 0.180 | 0.156 |
| CuO | 0.0230 | 0.0230 | 0.0120 | 0.0110 |
| Sb$_2$O$_3$ | 0.54 | 0.49 | — | — |

|  | 29 | 30 | 31 | 32 |
|---|---|---|---|---|
| SiO$_2$ | 41.39 | 39.41 | 39.27 | 42.15 |
| B$_2$O$_3$ | 27.61 | 20.71 | 18.46 | 17.08 |
| Al$_2$O$_3$ | 9.58 | 5.81 | 5.79 | 5.70 |
| ZrO$_2$ | — | 2.34 | 2.33 | 2.91 |
| Li$_2$O | 2.49 | 0.94 | 1.13 | 4.87 |
| Na$_2$O | 1.29 | 1.18 | 1.17 | 0.61 |
| K$_2$O | 3.93 | 12.00 | 14.28 | 4.63 |
| CaO | 1.17 | 2.13 | 2.12 | — |
| La$_2$O$_3$ | 1.70 | 3.10 | 3.09 | — |
| Nb$_2$O$_5$ | 8.32 | 10.11 | 10.07 | 10.40 |
| TiO$_2$ | 2.50 | 2.28 | 2.27 | 4.39 |
| SrO | — | — | — | 6.25 |
| SiO$_2$ + B$_2$O$_3$ | 69.0 | 60.1 | 57.7 | 59.2 |
| Li$_2$O/X$_2$O | 0.32 | 0.07 | 0.07 | 0.48 |
| Al$_2$O$_3$ + ZrO$_2$ | 9.6 | 8.2 | 8.1 | 8.6 |
| Nb$_2$O$_5$ + TiO$_2$ + ZrO$_2$ + La$_2$O$_3$ | 12.5 | 17.8 | 17.8 | 17.7 |
| XO | 1.2 | 2.1 | 2.1 | 6.3 |
| XO + X$_2$O | 8.9 | 16.2 | 18.7 | 16.4 |
| Ag | 0.190 | 0.257 | 0.253 | 0.147 |
| Cl | 0.240 | 0.333 | 0.355 | 0.219 |
| Br | 0.150 | 0.148 | 0.152 | 0.145 |
| CuO | 0.0120 | 0.0100 | 0.0100 | 0.0170 |
| Sb$_2$O$_3$ | — | — | — | 0.79 |

|  | 33 | 34 |
|---|---|---|
| SiO$_2$ | 42.15 | 42.15 |
| B$_2$O$_3$ | 17.08 | 17.08 |
| Al$_2$O$_3$ | 5.70 | 5.70 |
| ZrO$_2$ | 2.91 | 2.91 |
| Li$_2$O | 4.87 | 4.87 |
| Na$_2$O | 0.61 | 0.61 |
| K$_2$O | 4.63 | 4.63 |
| Nb$_2$O$_5$ | 10.40 | 10.40 |
| TiO$_2$ | 4.39 | 4.39 |
| SrO | 6.25 | 6.25 |
| SiO$_2$ + B$_2$O$_3$ | 59.2 | 59.2 |
| Li$_2$O/X$_2$O | 0.48 | 0.48 |
| Al$_2$O$_3$ + ZrO$_2$ | 8.6 | 8.6 |
| Nb$_2$O$_5$ + TiO$_2$ + ZrO$_2$ + La$_2$O$_3$ | 17.7 | 17.7 |
| XO | 6.3 | 6.3 |
| XO + X$_2$O | 16.4 | 16.4 |
| Ag | 0.144 | 0.123 |
| Cl | 0.220 | 0.235 |
| Br | 0.142 | 0.160 |
| CuO | 0.0170 | 0.0235 |
| Sb$_2$O$_3$ | 0.70 | 0.39 |

Samples of glasses prepared from the compositions of Table I were placed in an electric furnace for a specific heat treatment (HT). Temperature (in °C.) and time of heat treatment (in minutes) are reported on Table II. Generally, a temperature between about 580° and 640° C. for times between about five minutes to two hours has been found satisfactory to obtain the desired optical properties. After heat treatment, the samples are ground and polished to a thickness of 2 mm for properties measurement.

Table II gives also the photochromic performances, the color, the refractive index (n$_D$), the Abbe number ($v$), the density (Den), and the viscosity (Vis) at the devitrification liquidus of the glasses. Two glass melts crystallized (devitrified) upon cooling, thereby resulting in an opaque glass body.

The color of the glasses is expressed as the trichromatic coordinates (x,y) defined by the C.I.E. colorimetric system of 1931 which uses the C illuminant. This colorimetric system and the light source are explained by A. C. Hardy in the Handbook of Colorimetry, Technology Press, M.I.T., Cambridge, Mass. (1936).

The color of the darkened state (x$_{20}$, y$_{20}$) is determined after a 20-minute exposure at 25° C. to a commercially-available ultraviolet light termed "black-light-blue". The corresponding luminous transmission is reported as T$_{D20}$.

The luminous transmissions representing the behavior of the glasses under an actinic radiation similar to sunlight have been measured with equipment called "Solar-Simulator," which equipment is described in U.S. Pat. No. 4,190,451.

In Table II:

T$_o$ is the luminous transmission of the glass in the clear state (unexposed).

$T_{D15}$ (25° C.) is the luminous transmission after darkening 15 minutes in the simulated sunlight source at 25° C.

$T_{D15}$ (40° C.) is the luminous transmission after darkening 15 minutes in the simulated sunlight source at 40° C.

$T_{F5}$ (25° C.) is the luminous transmission after fading 5 minutes after removal from the simulated sunlight source at 25° C.

$\Delta T_{D15}$ (25°–40° C.) is the difference between transmissions after darkening 15 minutes in the simulated sunlight source at 25° and 40° C.

The measurements of the refractive index and Abbe number are made by the usual methods on annealed samples.

The density is measured by the immersion method and expressed in g/cm$^3$.

The liquidus temperature or upper crystallization temperature is determined with a gradient furnace. The duration of heat treatment is 17 hours; the presence of crystals is detected by using an optical microscope. The viscosity (expressed in poises) corresponding to the liquidus temperature is measured with a rotating viscosimeter.

TABLE II

| | 1 | 2 | 3 | 4 | 5 |
|---|---|---|---|---|---|
| HT | 600–15 | 600–15 | 600–15 | 600–15 | 620–15 |
| $T_o$ | 91.5 | 90.6 | 90.3 | 90.8 | 89.8 |
| $T_{D15}$ (25° C.) | 26.8 | 22.3 | 24.2 | 31.2 | 32.5 |
| $T_{D15}$ (40° C.) | 43.8 | 40.6 | 40.4 | 45.6 | 49.3 |
| $T_{F5}$ (25° C.) | 61.2 | 59.0 | 56.5 | 57.2 | 69.6 |
| $\Delta T_{D15}$ (25°–40° C.) | 17.0 | 18.3 | 16.2 | 14.4 | 16.8 |
| $n_D$ | 1.588 | 1.585 | 1.585 | 1.589 | 1.589 |
| $\nu$ | 47.50 | 47.00 | 46.70 | 47.10 | 44.00 |
| Den. | 2.65 | 2.61 | 2.63 | 2.71 | — |
| Vis. | 400 | 350 | — | 500 | >500 |

| | 6 | 7 | 8 | 9 | 10 |
|---|---|---|---|---|---|
| HT | 600–15 | 600–15 | 620–15 | 620–15 | 620–15 |
| $T_o$ | 90.5 | 89.5 | 89.2 | 89.7 | 88.5 |
| $T_{D15}$ (25° C.) | 32.0 | 39.1 | 28.3 | 34.2 | 38.3 |
| $T_{D15}$ (40° C.) | 51.9 | 55.1 | 44.7 | 53.4 | 59.2 |
| $T_{F5}$ (25° C.) | 63.2 | 67.8 | 65.5 | 71.4 | 75.6 |
| $\Delta T_{D15}$ (25°–40° C.) | 19.9 | 16.0 | 16.4 | 19.2 | 20.9 |
| $n_D$ | 1.603 | 1.585 | 1.594 | 1.594 | 1.599 |
| $\nu$ | 43.00 | 46.60 | 45.00 | 45.00 | 43.00 |
| Den. | 2.68 | 2.62 | 2.68 | 2.68 | — |
| Vis. | >350 | 200 | 500 | 500 | >500 |

| | 11 | 12 | 13 | 14 | 15 |
|---|---|---|---|---|---|
| HT | 620–15 | 620–15 | 610–15 | 610–15 | 610–15 |
| $T_{D20}$ | — | — | 40.95 | 40.7 | 41.59 |
| $x_{20}$ | — | — | 0.3258 | 0.3187 | 0.3485 |
| $y_{20}$ | — | — | 0.3244 | 0.3214 | 0.3384 |
| $T_o$ | 89.2 | 87.7 | 90.2 | 90.2 | 85.9 |
| $T_{D15}$ (25° C.) | 23.0 | 29.8 | 23.9 | 30.5 | 23.7 |
| $T_{D15}$ (40° C.) | 42.1 | 49.1 | 42.3 | 51.6 | 44.1 |
| $T_{F5}$ (25° C.) | 61.6 | 67.4 | 58.0 | 67.7 | 63.5 |
| $\Delta T_{D15}$ (25°–40° C.) | 19.1 | 19.3 | 18.4 | 21.1 | 20.4 |
| $n_D$ | 1.596 | 1.596 | 1.601 | 1.601 | 1.601 |
| $\nu$ | 44.00 | 44.00 | 44.00 | 44.00 | 44.00 |
| Den. | — | 2.62 | 2.69 | 2.69 | 2.69 |
| Vis. | >400 | >400 | >500 | >500 | >500 |

| | 16 | 17 | 18 | 19 | 20 |
|---|---|---|---|---|---|
| HT | 610–15 | 610–15 | 610–15 | 610–15 | 610–15 |
| $T_{D20}$ | 40.73 | 50.08 | 39.04 | 40.3 | 39.4 |
| $x_{20}$ | 0.3268 | 0.3370 | 0.3503 | 0.3472 | 0.3505 |
| $y_{20}$ | 0.3268 | 0.3343 | 0.3364 | 0.3356 | 0.3364 |
| $T_o$ | 89.2 | 87.2 | 84.5 | 85.5 | 86.8 |
| $T_{D15}$ (25° C.) | 26.0 | 36.1 | 22.3 | 28.4 | 24.6 |
| $T_{D15}$ (40° C.) | 45.5 | 55.5 | 37.4 | 47.5 | 43.0 |
| $T_{F5}$ (25° C.) | 65.3 | 70.4 | 60.1 | 66.5 | 62.4 |
| $\Delta T_{D15}$ (25°–40° C.) | 19.5 | 19.4 | 15.1 | 19.1 | 18.4 |
| $n_D$ | 1.601 | 1.601 | 1.601 | 1.601 | 1.600 |
| $\nu$ | 44.00 | 44.00 | 44.00 | 44.00 | 44.00 |
| Den. | 2.69 | 2.69 | 2.69 | 2.69 | 2.70 |
| Vis. | >500 | >500 | >500 | >500 | >500 |

| | 21 | 22 | 23 | 24 | 25 |
|---|---|---|---|---|---|
| HT | 610–15 | 610–15 | 610–15 | 610–15 | 610–15 |
| $T_{D20}$ | 41.9 | 39.5 | 40.2 | 42.6 | 43.4 |
| $x_{20}$ | 0.3459 | 0.3466 | 0.3490 | 0.3452 | 0.3444 |
| $y_{20}$ | 0.3365 | 0.3333 | 0.3368 | 0.3334 | 0.3355 |
| $T_o$ | 84.5 | 85.4 | 85.4 | 86.0 | 85.0 |
| $T_{D15}$ (25° C.) | 26.8 | 25.6 | 26.5 | 30.1 | 30.2 |
| $T_{D15}$ (40° C.) | 43.9 | 42.6 | 45.0 | 48.3 | 47.8 |
| $T_{F5}$ (25° C.) | 64.2 | 62.0 | 62.8 | 66.3 | 65.4 |
| $\Delta T_{D15}$ (25°–40° C.) | 17.1 | 17.0 | 18.5 | 18.2 | 17.6 |
| $n_D$ | 1.600 | 1.600 | 1.600 | 1.600 | 1.600 |
| $\nu$ | 44.00 | 44.00 | 44.00 | 44.00 | 44.00 |
| Den. | 2.70 | 2.70 | 2.70 | 2.70 | 2.70 |
| Vis. | >500 | >500 | >500 | >500 | >500 |

| | 26 | 27 | 28 | 29 | 30 |
|---|---|---|---|---|---|
| HT | 610–15 | 600–15 | 600–15 | 600–15 | 600–15 |
| $T_{D20}$ | 43.9 | C | — | C | — |
| $x_{20}$ | 0.3449 | R | — | R | — |
| $y_{20}$ | 0.3358 | Y | — | Y | — |
| $T_o$ | 85.6 | S | 90.4 | S | 87.1 |
| $T_{D15}$ (25° C.) | 32.5 | T | 51.6 | T | 18.0 |
| $T_{D15}$ (40° C.) | 49.4 | A | 71.7 | A | 28.1 |
| $T_{F5}$ (25° C.) | 66.5 | L | 81.5 | L | 42.2 |
| $\Delta T_{D15}$ (25°–40° C.) | 16.9 | L | 20.1 | L | 10.1 |
| $n_D$ | 1.600 | I | 1.602 | I | 1.565 |
| $\nu$ | 44.00 | Z | 44.30 | Z | 47.00 |
| Den. | 2.70 | E | 2.69 | E | 2.58 |
| Vis. | >500 | D | <100 | D | — |

| | 31 | 32 | 33 | 34 |
|---|---|---|---|---|
| HT | 600–15 | 610–15 | 610–15 | 610–15 |
| $T_{D20}$ | — | 23.15 | 23.31 | 44.71 |
| $x_{20}$ | — | 0.3303 | 0.3285 | 0.3284 |
| $y_{20}$ | — | 0.3048 | 0.3016 | 0.3196 |
| $T_o$ | 89.9 | 85.2 | 82.2 | 84.3 |
| $T_{D15}$ (25° C.) | 40.8 | 14.6 | 17.5 | 46.5 |
| $T_{D15}$ (40° C.) | 42.0 | 22.6 | 23.2 | 48.0 |
| $T_{F5}$ (25° C.) | 48.6 | 43.9 | 41.2 | 60.1 |
| $\Delta T_{D15}$ (25°–40° C.) | 1.2 | 8.0 | 5.7 | 1.5 |
| $n_D$ | 1.572 | 1.600 | 1.600 | 1.600 |
| $\nu$ | 47.70 | 44.00 | 44.00 | 44.00 |
| Den. | 2.62 | 2.70 | 2.70 | 2.70 |
| Vis. | 260 | >500 | >500 | >500 |

Examples 1 to 5 are representative of compositions leading to photochromic glasses which are gray in the darkened state and which contain one or more divalent metals or alkaline-earths.

Examples 6 and 7 illustrate compositions of gray photochromic glasses in the darkened state which contain La$_2$O$_3$.

Examples 8 to 14 represent photochromic glasses which have a similar base composition but different Ag, Br, Cl and CuO contents.

Examples 15 and 16 represent brown photochromic glasses in the darkened state, containing As$_2$O$_3$ and SnO$_2$, respectively.

Examples 17 to 26 deal with brown photochromic glasses in the darkened state based on Sb$_2$O$_3$ and obtained from variable Ag, Br, Cl, CuO, and Sb$_2$O$_3$ amounts.

The color of those glasses can be compared to Example 14 color which is representative of a gray photochromic glass.

Examples 8, 12, 14, 20, and 24 illustrate preferred embodiments of the invention, not only for the photochromic properties, but also for the overall physical and chemical characteristics.

Examples 27 to 34 represent glasses obtained from compositions which are not in the prescribed ranges of the invention.

Example 27 shows the negative effect of the (XO+X$_2$O) sum on the glass stability against devitrification.

Example 28 is outside the ZrO$_2$ claimed range. Furthermore, the impact of the sum (ZrO$_2$+Al$_2$O$_3$) on the liquidus viscosity can be observed by comparing this Example to Examples 6 to 7. Example 28 shows a liquidus viscosity lower than 100 poises which does not allow the use of conventional pressing techniques.

Example 29 is outside B$_2$O$_3$ and Al$_2$O$_3$ claimed ranges. The negative effect of the (SiO$_2$+B$_2$O$_3$) sum on the glass stability appears by comparison with Examples 6 and 7.

Examples 30 and 31 illustrate the effect of Li$_2$O, K$_2$O, and Li$_2$O/X$_2$O. Both of them show a faded transmission well below 55%.

Examples 32 and 33 illustrate the effect of a high Sb$_2$O$_3$ amount. The faded transmission is well below 55% and, consequently, below the faded transmission of the glasses according to the invention containing Sb$_2$O$_3$ (T$_{F5}$>60%).

Example 34 shows the effect of a small Ag content. The faded transmission is greater than 60%, but the glass does not darken enough.

I claim:

1. A photochromic glass having a refractive index greater than 1.585, an Abbe number greater than 42, a density lower than 2.80 g/cm$^3$, a liquidus viscosity of at least 200 poises, and, at a thickness of 2 mm, exhibits photochromic properties of
   (I) a luminous transmission in the unexposed state greater than 84%,
   (II) a luminous transmission in the darkened state after 15 minutes' exposure to actinic radiation at a temperature between 0°-25° C. of less than 40%,
   (III) a fading rate at 20°-25° C. such that five minutes after removal from the actinic radiation the glass has a luminous transmission of at least 55%, and
   (IV) a difference between the luminous transmissions of the darkened state over the temperature range 25°-40° C. of less than 23 points of transmission, said glass consisting essentially of:

(a) a base glass composition consisting essentially, expressed in terms of weight percent on the oxide basis, of

| | | | |
|---|---|---|---|
| SiO$_2$ | 33-50 | MgO | 0-5 |
| B$_2$O$_3$ | 15-25 | CaO | 0-5 |
| SiO$_2$ + B$_2$O$_3$ | 58-66 | SrO | 0-10 |
| Al$_2$O$_3$ | 2-9 | BaO | 0-10 |
| ZrO$_2$ | 1-5 | ZnO | 0-5 |
| Al$_2$O$_3$ + ZrO$_2$ | 4-10 | MgO + CaO + SrO + BaO + ZnO | 1-15 (XO) |
| Li$_2$O | 1.5-6 | X$_2$O + XO | 10-24 |
| Na$_2$O | 0-4 | La$_2$O$_3$ | 0-5 |
| K$_2$O | 2-9 | Nb$_2$O$_5$ | 8-16 |
| Li$_2$O + Na$_2$O + K$_2$O | 7-16 (X$_2$O) | TiO$_2$ | 2-8 |
| Li$_2$O/X$_2$O | 0.20-0.50 | ZrO$_2$ + TiO$_2$ + Nb$_2$O$_5$ + La$_2$O$_3$ | 14-23 | and
   (b) photochromic elements consisting essentially, as analyzed in weight percent, of

| | |
|---|---|
| Ag | 0.130-0.280 |
| Br | 0.130-0.220 |
| Ag + Br | >0.270 |
| Cl | 0.170-0.360 |
| CuO | 0.0070-0.0350. |

2. A photochromic glass according to claim 1 wherein said base glass composition also contains about 0.1-1% total, as analyzed in weight percent, of at least one member of the group consisting of As$_2$O$_3$, Sb$_2$O$_3$, and SnO$_2$.

3. A photochromic glass according to claim 2 wherein said member of the group consists of 0.10-0.65% Sb$_2$O$_3$.

4. A photochromic glass according to claim 1 wherein said base glass composition consists essentially of:

| | | | |
|---|---|---|---|
| SiO$_2$ | 36-48 | MgO | 0 |
| B$_2$O$_3$ | 15-20 | CaO | 0 |
| SiO$_2$ + B$_2$O$_3$ | 57-63 | SrO | 2-8 |
| Al$_2$O$_3$ | 5-8 | BaO | 0 |
| ZrO$_2$ | 1-4 | ZnO | 0 |
| Al$_2$O$_3$ + ZrO$_2$ | 6-10 | MgO + CaO + SrO + BaO + ZnO | 2-9 (XO) |
| Li$_2$O | 2-5.5 | X$_2$O + XO | 10-20 |
| Na$_2$O | 0.3-2.5 | La$_2$O$_3$ | 0 |
| K$_2$O | 3-8 | Nb$_2$O$_5$ | 8-14 |
| Li$_2$O + Na$_2$O + K$_2$O | 8-12 | TiO$_2$ | 2-7 (X$_2$O) |
| Li$_2$O/X$_2$O | 0.35-0.50 | ZrO + TiO$_2$ + Nb$_2$O$_5$ + La$_2$O$_3$ | 15-23 | and said photochromic elements consist essentially of:

| | |
|---|---|
| Ag | 0.135-0.180 |
| Br | 0.140-0.170 |
| Ag + Br | >0.280 |
| Cl | 0.200-0.300 |
| CuO | 0.0120-0.300. |

5. A photochromic glass according to claim 4 wherein said base glass composition also contains about 0.1-1% total, as analyzed in weight percent, of at least one member of the group consisting of As$_2$O$_3$, Sb$_2$O$_3$, and SnO$_2$.

6. A photochromic glass according to claim 5 wherein said member of the group consists of 0.10-0.65% Sb$_2$O$_3$.

* * * * *